United States Patent [19]

Tyan et al.

[11] Patent Number: 5,051,340
[45] Date of Patent: Sep. 24, 1991

[54] MASTER FOR OPTICAL ELEMENT REPLICATION

[75] Inventors: Yuan S. Tyan, Webster; Kee C. Pan, Pittsford; George R. Olin, Webster; Thomas Mayer, Honeoye Falls, all of N.Y.

[73] Assignee: Eastman Kodak Company, Rochester, N.Y.

[21] Appl. No.: 370,946

[22] Filed: Jun. 23, 1989

[51] Int. Cl.$^5$ .............................. G03C 5/00
[52] U.S. Cl. ................... 430/321; 430/320; 430/323; 430/290; 430/945; 156/628; 369/100
[58] Field of Search ............ 430/321, 945, 323, 290, 430/320; 156/628; 369/100

[56] References Cited

U.S. PATENT DOCUMENTS

| | | | |
|---|---|---|---|
| 4,109,045 | 8/1978 | Goshima et al. | 428/212 |
| 4,214,249 | 7/1980 | Kasai et al. | 346/76 L |
| 4,264,551 | 4/1981 | Oonishi et al. | 364/107 |
| 4,615,969 | 10/1986 | Strand | 430/320 |
| 4,710,911 | 12/1987 | Yamada et al. | 369/100 |
| 4,773,059 | 9/1988 | Minemura et al. | 369/100 |

FOREIGN PATENT DOCUMENTS 0185097 6/1986 European Pat. Off. .

OTHER PUBLICATIONS

Patent Abstracts of Japan, vol. 10, No. 157, p. 455, 12/1985.

Primary Examiner—Charles L. Bowers, Jr.
Assistant Examiner—Kathleen Duda
Attorney, Agent, or Firm—J. Jeffrey Hawley

[57] ABSTRACT

A master for the replication of optical elements is prepared by the steps of:
(a) focusing an information modulated energy beam on a phase-change optical recording layer so as to form a pattern of two different phases in said layer corresponding to said information; and
(b) selectively etching away one of said two different phases so as to form a relief pattern corresponding to said information.

The master so made can be used directly as the stamper in the injection molding process or the 2-P process for the replication of optical elements.

2 Claims, 2 Drawing Sheets

MASTER FOR OPTICAL ELEMENT REPLICATION

FIELD OF THE INVENTION

The present invention is directed to a method for forming the master that is used in the replication of optical elements and the master itself. Also disclosed is a method for replication that uses the master of the invention as the stamper.

DESCRIPTION RELATIVE TO THE PRIOR ART

It is well known in the art to form an optical element containing large amounts of information. Video disks and digital audio disks are typical optical elements. It is readily apparent that there is a need to be able to easily and cheaply replicate these elements.

Conventionally, optical disks or disk supports are replicated using either the injection molding process or the 2-P ("2-P" is a shorthand reference to photopolymerization) process. In these processes, a mastering disc in the form of a photoresist coated glass disc is first exposed with a modulated laser beam so that, after photoresist development, the desired information is encoded into the photoresist layer in the form of a relief pattern of pits and/or grooves. Since the exposed and developed photoresist can not be used directly, this master disc must then be metallized to provide a conductive surface for a following nickel electro-plating process. The nickel plated layer is peeled off from the master disc to form what is called a stamper. A center hole is then punched and the outside diameter is trimmed to the desired dimensions and the back surface is polished so that the stamper can fit into the injection molding machine or the 2-P machine to perform the replication process.

One problem with this process is that the photoresist layer used to form the master is only sensitive to UV radiation. This necessitates the use of gas UV lasers to form the information pattern in the photoresist layer. These lasers are expensive, bulky, and difficult to control. They have to be mounted separately from the optics necessary to focus them, making alignment costly and difficult.

Another problem is that the absorption of the laser beam by the photoresist layers is not very efficient. As a result, the laser exposure step has to be carried out at relatively slow speed, limiting the throughput of the process.

Another problem is that the photoresist layer tends to swell during subsequent development steps. This can limit the resolution and useful packing density of recorded information. This also complicates the replication process when fine control of replicate feature dimensions is needed.

Another problem is that the stamper making process is complicated. It involves metalizing, electro-plating, polishing, peeling, punching, and trimming. As a result, the equipment is expensive, the yield is low and the process is time consuming.

The art relating to processes for replicating optical elements is extensive and only a few of the many patents will be mentioned here. In U.S. Pat. No. 4,724,043 issued Feb. 9, 1988 there is disclosed a method wherein the glass support for the master is first coated with a layer of an oxide or nitride. Otherwise, the process is conventional and has all of the difficulties discussed above. In U.S. Pat. No. 4,650,753 issued Mar. 17, 1987, there is described another recent method using a photoresist to form the master.

In U.S. Pat. No. 4,565,772 there is described a radiation sensitive material which, after exposure to a modulated laser beam, can be used directly as the stamper. The radiation sensitive material is a complicated multilayer structure. It relies on a radiation sensitive layer which discharges gas when irradiated with laser energy, thereby causing a deformation in an overlying metal layer.

Thus, there continues to be the need for a method for replicating optical elements where the master does not need to be formed using a photoresist. The method should be simple and should be rapid, thereby increasing the reliability and throughput for the process.

SUMMARY OF THE INVENTION

The present invention represents a radical departure from the conventional methods for making the master for optical element replication. No photoresist is used. Instead, a phase-change optical recording element is first exposed so as to form a pattern in the recording layer as would be conventional for this type of element. Thus, for example, a pattern of crystalline areas is formed in a layer that is otherwise amorphous or a pattern of amorphous material is formed in a layer that is otherwise crystalline. Then, the master is formed by selectively etching either the amorphous areas or the crystalline areas thereby forming the desired relief pattern on the surface of the master.

Thus, in accordance with one aspect of the invention, there is provided a method for forming a master for making replicate optical elements, said method comprising the steps of:

a) focusing an information modulated energy beam on a phase-change optical recording layer so as to form a pattern of two different phases in said layer corresponding to said information; and b) selectively etching away one of said two different phases so as to form a relief pattern corresponding to said information.

In accordance with another aspect of the invention, there is provided the master produced by the above method.

In accordance with another aspect of the invention, there is provided a method for making a stamper from said master including the additional steps of plating said relief pattern to form a stamper layer and then removing said stamper layer from the surface of said master.

In accordance with yet another aspect of the invention there is provided a method for replicating optical elements using the master described above as the stamper.

Other aspects of the invention will become clear from the following detailed description.

DETAILED DESCRIPTION OF THE INVENTION

Figure 1A:
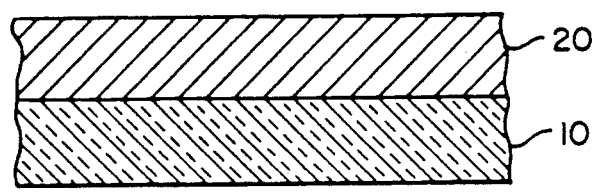
In FIG. 1 there is illustrated a schematic representation of the method of forming a master according to the present invention.

Optical elements are most commonly produced in the form of a disk. However, as will be appreciated, the replication method of the invention is not limited to this form of element. Other forms, such as for example credit card shaped elements, are also contemplated. For convenience, the replication of disks will be described in detail with the understanding that adaptations to other forms can be easily accomplished by those skilled in the art.

The current invention provides an improved method for forming the master for making optical elements. This method utilizes phase-change optical recording layers to replace the photoresist layer in the conventional mastering method. The phase-change layers are typically sensitive to the radiation of diode lasers. Therefore, the use of troublesome gas lasers can be avoided. The sensitivity of the layers to energy induced phase-change is usually very high. The speed of the exposure step can therefore be greatly improved compared to the process using photoresists and UV lasers.

The problems associated with the swelling of the photoresists usually used to make the master are completely eliminated.

In the process of the invention, the master can be tested at various stages in its preparation to insure successful completion of previous steps. Thus, the process can be restarted before the difficult stamper plating and peeling steps are attempted thereby reducing wasted effort. For example, the information in the phase-change layer can be confirmed before and after the etching step.

The adhesion of the phase-change recording materials to the supports on which they are coated is excellent. In addition, the phase-change material is a metal alloy and is therefore very durable. It is much more durable, for example, than exposed and developed photoresist. Thus the master of the invention can be used directly as the stamper, eliminating entirely the need for making a separate stamper, for example, by nickel plating.

The ability to use the master of the invention as a stamper in the replication process is a significant advantage of the invention. This feature makes it economically feasible for the first time to make only a few hundred replicates. In the prior art process, the extremely high cost of forming the nickel stamper had to be distributed over a very large number of replicates so that the cost per replicate could be reasonable. In fact, the speed and ease of making the present master makes it economically feasible to simply make additional masters where up to several thousand replicates are needed. Of course, the ease of making the present master is also an advantage even where nickel stampers are needed for extremely long production runs.

The present invention utilizes the difference in the etching rate for two different phases of the same alloy. Where two different phases are formed, there will almost always be a difference in the etching rate. Thus, any phase-change optical recording material can be used in the present invention. Usually, the two phases that are used for phase-change optical recording are the amorphous phase and the crystalline phase. Etchants can be found for these materials that preferentially etch the crystalline phase and either do not etch the amorphous phase or etch the amorphous phase at a much slower rate.

Thus, it is preferred to form the master of the invention by providing a amorphous phase-change optical recording layer and recording the information in the form of crystalline marks and/or grooves in the amorphous layer. The crystalline marks are then preferentially etched so as to leave the desired relief in the surface of the master.

Figure 1B:
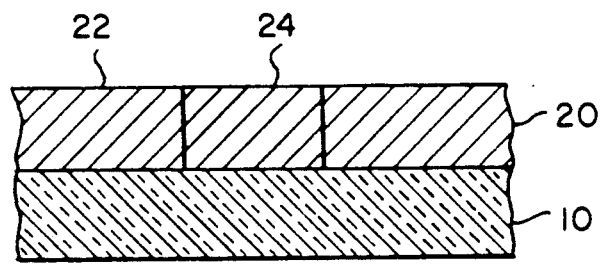
Figure 1C:
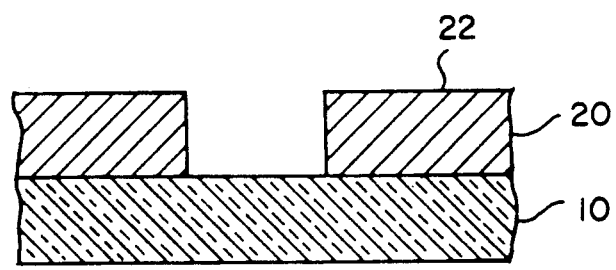

The method of the invention is illustrated in schematic FIG. 1. In FIG. 1a, there is shown a phase-change optical recording element before exposure. The element comprises a support 10 having thereon a phase change optical recording layer 20. FIG. 1b illustrates the element of FIG. 1a after recording. The layer contains unrecorded portions of amorphous material 22 and recorded portions of crystalline material 24. In FIG. 1c, there is shown the element after etching. The crystalline portions 24 in FIG. 1b have been etched away leaving amorphous portions 22. The resulting element can be used as a master or stamper as described herein.

The present invention is not limited to etching crystalline areas. For some materials, the amorphous areas may be preferentially etched. Other materials, such as those found in European Patent application No. 0184452 record information as the difference between two different crystalline phases. Preferentially etching one of these phases to form a master would therefore be within the scope of the present invention.

The selection of the phase-change recording material is not critical. Useful phase-change optical recording materials for use in the present invention are described, for example, in:

U.S. Ser. No. 014,336 filed Feb. 13, 1987 by Pan, Tyan and Preuss, now abandoned in favor of continuation-in-part U.S. Ser. No. 194,605 filed May 16, 1988, now abandoned; (antimony-tin and antimony-tin and indium);

U.S. Ser. No. 014,337 filed Feb. 13, 1987 by Pan, Tyan and Marino; and divisional U.S. Ser. No. 197,557 filed May 23, 1988, now U.S. Pat. No. 4,812,386; (antimony-tin and germanium);

U.S. Ser. No. 058,721 filed June 5, 1987 by Pan, Tyan and Vazan, now U.S. Pat. No. 4,798,785; (antimony-tin and aluminum);

U.S. Ser. No. 058,722 filed June 5, 1987 by Pan, Tyan and Preuss, now U.S. Pat. No. 4,774,170; (antimony-tin and zinc);

U.S. Ser. No. 229,958 filed Aug. 9, 1988 by Pan, Tyan, Vazan and Preuss, now abandoned; (antimony-tin and various third elements);

U.S. Ser. No. 273,790 filed Nov. 21, 1988 by Tyan, Raychaudhuri and Vazan, now U.S. Pat. No. 4,904,577; (antimony-tin-indium and a fourth element); and U.S. Ser. No. 286,003 filed Dec. 19, 1988 by Pan, Tyan and Vazan, now abandoned; (antimony-tellurium).

Other useful optical recording phase-change materials include germanium-tellurium alloys, particularly those containing aluminum, titanium, tin and antimony. These phase-change optical recording materials are particularly suitable because they have high sensitivity to diode laser radiation, are chemically stable, and form crystalline marks with well defined boundaries. These materials are employed in the form of continuous thin films with a thickness of from about 100 angstroms to about 2000 microns.

The selection of the particular etchant is also not critical. The etchant is chosen so as to preferentially etch one of the phases in the phase-change material. In general, these etchant solutions consist of acids, bases or acidic or basic oxidizing species in a suitable solvent. Specifically, these etchants include concentrated hydrochloric acid and its dilutions, with water, down to 0.01 vol %; concentrated sulfuric acid and its dilutions, with water, down to about 0.01 vol %; oxalic acid solutions in water with a concentration range of about 0.01 wt % to 12 wt %; $(NH_4)_2S_2O_8$ solutions in water with a concentration range of about 0.01 wt % to 12 wt %; $Na_2Cr_2O_7$ solutions in water with a concentration range of about 0.01 wt % to 12 wt %; $K_3Fe(CN)_6$ solutions in water with a concentration range of about 0.01 wt % to 12 wt %; potassium and sodium hydroxide solutions in water with a concentration range of about 0.01 wt. % to about 12 wt %; ammonium hydroxide solutions in water with a concentration range of about 0.01 wt. % to about 12 wt %. Any combination of two or more of the above etchants is also useful.

For improved wetting of the phase-change optical recording layer by the etchant and more uniform etching of large areas, a suitable surfactant may be added to the etchant in an amount sufficient to obtain useful wetting properties. Useful surfactants include, but are not limited to, polyoxyethylene ethers such as those sold under the Triton TM mark (for example, Triton TM X-100 and Triton TM N101), or under the Nonidet or Brij tradenames (such as Nonidet P-40 and Brij 35), polyoxyethylenesorbitan derivatives such as those sold under the Tween tradename (for example Tween 20 or Tween 40), and polyglycol ethers such as those sold under the Tergitol tradename (for example Tergitol NPX and NP-7). Other useful surfactants include fluorinated surfactants such as those sold under the Fluorad TM mark such as Fluorad FC-99.

It was observed that the extent of surface oxidation of the amorphous film and of the laser crystallized marks affected the etching rate. As a result, the optimum etch duration depends on the storage time and storage environment of the alloy film. Etching of freshly written marks in freshly prepared alloy films is the preferred embodiment of this invention.

The etching step is carried out in a conventional manner. An exposed phase-change optical recording layer can be immersed in the etching bath or the etching bath can be sprayed on the exposed surface. It is preferred to immerse the layer in the etching bath and spin the layer during etching so as to promote uniform etching.

The master formed by the described process is another aspect of the invention. Thus, there is provided a master for making replicate optical elements, said master comprising a support having thereon an etched phase-change optical recording layer having a relief pattern corresponding to to the information that is to be transferred to said optical element.

Because of the excellent adhesion of our selected phase-change layers to glass, and the good abrasion resistance of the materials, a glass support master can be used directly as a stamper for reproducing information by pressing into contact with an appropriate polymer as in the 2-P process. This greatly simplifies the stamper making process.

Photopolymerizable polymer compositions that are useful in this embodiment are well known in the art and are described, for example in U.S. Pat. Nos. 4,729,938; 4,296,158; 4,312,823 and 4,668,558. A particularly preferred composition is as follows: hexanediol diacrylate (40 parts by weight); pentaerythritol triacrylate (20 parts by weight); Celrad TM 3200, a diacrylated epoxy oligomer from Interez Inc. (40 parts by weight) and Darocur TM 1173 an aromatic ketone photoinitiator from EM Industries, Inc. This is referred to in Example 9 and is the material used to make the replicate shown in FIG. 2.

The master of the invention can also be used in the production of nickel stampers for optical disk replication and/or support production. The etched phase-change master can be thermally or flash crystallized. It can also be conductively coated, electroplated with nickel and the nickel replicate polished, peeled, punched and trimmed to obtain a nickel stamper in the conventional manner.

As noted above, the masters of the invention can be used directly as stampers in the 2-P process. They can also be used directly in the injection molding process. In this embodiment, it is desirable to initially coat the phase-change optical recording material on a durable support. Suitable supports may include "blank" nickel stampers, polished stainless steel and structural polymers.

Polymers that can be used in the injection molding of replicates are conventional. Useful polymers include poly(vinylchloride); copolymeric vinylchloride vinylacetate; polycarbonate resins; poly(methylmethacrylates); and polystyrene. Preferred examples include Mobay Markrolon TM DP-1-12-18 polycarbonate and Teyin Panlite TM AD5503 polycarbonate.

Optical recording layers can be prepared by conventional thin film deposition techniques such as RF (radio frequency) and DC (direct current) sputtering from an alloy target using the alloys of the invention. Enhancement of sputtering processes by applying magnetic fields (magnetron sputtering) can also be used. The thickness of the films can be from a few tens to a few hundreds of nanometers depending on compromises among factors such as contrast, sensitivity, production rate, material cost, ease of control, data rate, etc.

Supports which can be used include plastic plates, such as polyethylene terephthalate, polymethyl methacrylate, and polycarbonate, a glass plate, paper and metallic plates such as aluminum. As noted above, where the master is used directly as a stamper in an injection molding process, the support is preferably a durable material.

Recording information on the thin film layers made using the alloy of this invention is achieved by focusing an information modulated laser beam on the layer thereby forming a pattern of information on the layer in the form of crystallized areas in an otherwise amorphous layer.

During recording, the recording material is typically spun at a constant rate, e.g., 1800 rotations per minute (rpm) or at a rate that changes as a function of the recording spot radial position. A track of information is recorded on the optical recording layer in the form of selected crystallized areas as a result of localized exposure to the modulated recording beam. As recording continues, the recording beam moves radially across the recording material, thereby causing information to be recorded along a spiral or concentric track. The sizes and spacings of the information encoded marks vary in accordance with the information content of the recording laser drive signal.

The following examples are presented for a further understanding of the invention.

EXAMPLE 1

A thin-film, about 70 nm in thickness on a glass support, of Sb-Sn-In alloy with atomic composition of 60%-25%-15% was prepared by RF-sputtering. The argon pressure used in the sputtering process was about 13 mTorr, and the RF power was about 1.5 Watt/cm$^2$. Crystalline spots and tracks were then written onto the disk while the disk was spinning on a spindle, using a focused 830 nm diode laser beam through a 0.55 NA objective.

A solution of 0.1 wt % oxalic acid in water was freshly prepared as etchant. The disk was immersed in the etchant for 50 seconds while the disk was spinning. The disk was then rinsed in distilled water. The disk was subsequently dried by spinning at high rate. The disk was then examined by optical microscopy and scanning electron microscopy (SEM). It was found that the laser crystallized spots and tracks were completely etched away and the boundaries were well defined. The amorphous area was only slightly etched. This etched disk was then ready to be used as a master or as a stamper.

EXAMPLE 2

A thin-film about 70 nm in thickness on a glass support, of Sb-Sn-In alloy with atomic composition of 60%-25%-15% was prepared and laser-marked as in Example 1.

A solution of 1.0 vol % hydrochloric acid in water was freshly prepared as etchant. The disk was immersed in the etchant for 240 seconds while the disk was spinning. The disk was then rinsed in distilled water. The disk was subsequently dried by spinning at high rate.

The disk was then examined by optical microscopy and SEM. It was found that the laser crystallized spots and tracks were completely etched away and the boundaries were well defined. The amorphous area was only slightly etched. This etched disk was then ready to be used as a master or as a stamper.

EXAMPLE 3

A thin-film about 70 nm in thickness on a glass support, of Sb-Sn-In alloy with atomic composition of 60%-25%-15% was prepared and laser-marked as in Example 1.

A solution of 0.1 wt % oxalic acid and 0.05 wt % Triton X-100 surfactant in water was freshly prepared as etchant. The disk was immersed in the etchant for 50 seconds while the disk was spinning. The disk was then rinsed sequentially in a 0.05 wt % Triton X-100 solution and in distilled water. The disk was subsequently dried by spinning at high rate.

The disk was then examined by optical microscopy and SEM. It was found that the laser crystallized spots and tracks were completely etched away and the boundaries were well defined. The amorphous area was only slightly etched. This etched disk was then ready to be used as a master or as a stamper.

EXAMPLE 4

A thin-film about 70 nm in thickness on a glass support, of Sb-Sn-In alloy with atomic composition of 60%-25%-15% was prepared and laser-marked as in Example 1.

A solution of 1.0 wt % hydrochloric acid and 0.05 wt % Fluorad FC-99 surfactant in water was freshly prepared as etchant. The disk was immersed in the etchant for 240 seconds while the disk was spinning. The disk was then rinsed sequentially in a 0.05 wt % Fluorad FC-99 solution and in distilled water. The disk was subsequently dried by spinning at high rate.

The disk was then examined by optical microscopy and SEM. It was found that the laser crystallized spots and tracks were completely etched away and the boundaries were well defined. The amorphous area was only slightly etched. This etched disk was then ready to be used as a master or as a stamper.

EXAMPLE 5

A thin-film about 70 nm in thickness on a glass support, of Sb-In alloy with atomic composition of 80%-20% was prepared and laser-marked as in Example 1.

A solution of 1.0 wt % hydrochloric acid and 0.05 wt % Fluorad FC-99 surfactant in water was freshly prepared as etchant. The disk was immersed in the etchant for 240 seconds while the disk was spinning. The disk was then rinsed sequentially in a 0.05 wt % Fluorad FC-99 solution and in distilled water. The disk was subsequently dried by spinning at high rate.

The disk was then examined by optical microscopy and SEM. It was found that the laser crystallized spots and tracks were completely etched away and the boundaries were well defined. The amorphous area was only slightly etched. This etched disk was then ready to be used as a master or as a stamper.

EXAMPLE 6

A thin-film about 70 nm in thickness on a glass support, of Sb-Sn-Ge alloy with atomic composition of 63%-21%-16% was prepared and laser-marked as in Example 1.

A solution of 1.0 wt % hydrochloric acid and 0.05 wt % Fluorad FC-99 surfactant in water was freshly prepared as etchant. The disk was immersed in the etchant for 360 seconds while the disk was spinning. The disk was then rinsed sequentially in a 0.05 wt % Fluorad FC-99 solution and in distilled water. The disk was subsequently dried by spinning at high rate. The disk was then examined by optical microscopy and SEM. It was found that the laser crystallized spots and tracks were completely etched away and the boundaries were well defined. The amorphous area was only slightly etched. This etched disk was then ready to be used as a master or as a stamper.

EXAMPLE 7

A thin-film about 70 nm in thickness on a glass support, of Sb-Sn-Al alloy with atomic composition of 61%-34%-5% was prepared and laser-marked as in Example 1.

A solution of 1.0 wt % hydrochloric acid and 0.05 wt % Fluorad FC-99 surfactant in water was freshly prepared as etchant. The disk was immersed in the etchant for 540 seconds while the disk was spinning. The disk was then rinsed sequentially in a 0.05 wt % Fluorad FC-99 solution and in distilled water. The disk was subsequently dried by spinning at high rate.

The disk was then examined by optical microscopy and SEM. It was found that the laser crystallized spots and tracks were completely etched away and the boundaries were well defined. The amorphous area was only slightly etched. This etched disk was then ready to be used as a master or as a stamper.

EXAMPLE 8

A thin-film about 70 nm in thickness on a glass support, of Sb-Sn-Zn alloy with atomic composition of 60%–25%–15% was prepared and laser-marked as in Example 1.

A solution of 1.0 wt % hydrochloric acid and 0.05 wt % Fluorad FC-99 surfactant in water was freshly prepared as etchant. The disk was immersed in the etchant for 600 seconds while the disk was spinning. The disk was then rinsed sequentially in a 0.05 wt % Fluorad FC-99 solution and in distilled water. The disk was subsequently dried by spinning at high rate.

The disk was then examined by optical microscopy and SEM. It was found that the laser crystallized spots and tracks were completely etched away and the boundaries were well defined. The amorphous area was only slightly etched. This etched disk was then ready to be used as a master or as a stamper.

EXAMPLE 9

A thin-film about 70 nm in thickness on a glass support, of Sb-Sn-In alloy with atomic composition of 60%–25%–15% was prepared and laser-marked as in Example 1 and then etched as in Example 3.

This etched disk was then employed as a stamper and pressed against another disk surface which had been coated with a cross-linkable polymer thin film as described previously. The polymer film was crosslinked via UV exposure and the disks were separated at the metal alloy:polymer interface. The polymer-coated disk replicate then had a thin film of the Sb-Sn-In alloy sputtered onto it to provide reflectivity and conductivity for subsequent optical microscopy and SEM observation.

Figure 2:
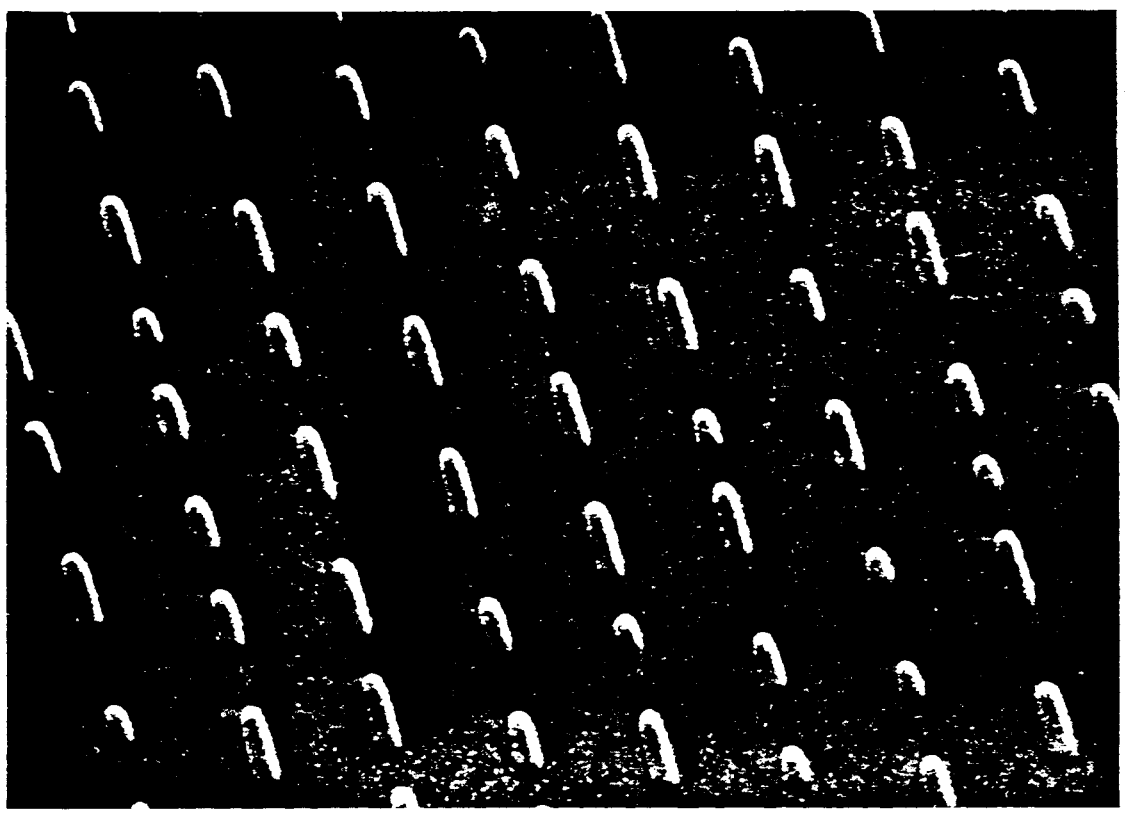
FIG. 2 is a photograph of the surface of a replica disk made using the master of the invention.

The optical and electron microscopy indicated that the marks initially laser-written and then etched away in the alloy thin film were accurately reproduced in the polymer layer of the replicate disk. This is shown in FIG. 2 which is a photograph of the surface of the replicate disk.

EXAMPLE 10

A thin-film about 70 nm in thickness on a glass support, of Ge-Te-Ti alloy with atomic composition of 45%–53%–2% was prepared and laser-marked as in Example 1.

A solution of 1.0 wt % $K_3Fe(CN)_6$, 0.25 vol % $H_2SO_4$ and 0.025 wt % Fluorad FC-99 surfactant in water was freshly prepared as etchant. The disk was immersed in the etchant for 120 seconds while the disk was spinning. The disk was then rinsed sequentially in a 0.025 wt % Fluorad FC-99 solution and in distilled water. The disk was subsequently dried by spinning at high rate.

The disk was then examined by optical microscopy and SEM. It was found that the laser crystallized spots and tracks were completely etched away and the boundaries were well defined. The amorphous area was only slightly etched. This etched disk was then ready to be used as a master or as a stamper.

EXAMPLE 11

A thin-film about 70 nm in thickness on a glass support, of Ge-Te-Ti alloy with atomic composition of 45%–53%–2% was prepared and laser-marked as in Example 1.

A solution of 3.0 wt % $(NH_4)_2S_2O_8$, 3.0 wt % NaOH and 0.025 wt % Fluorad FC-99 surfactant in water was freshly prepared as etchant. The disk was immersed in the etchant for 180 seconds while the disk was spinning. The disk was then rinsed sequentially in a 0.025 wt % Fluorad FC-99 solution and in distilled water. The disk was subsequently dried by spinning at high rate.

The disk was then examined by optical microscopy and SEM. It was found that the laser crystallized spots and tracks were completely etched away and the boundaries were well defined. The amorphous area was only slightly etched. This etched disk was then ready to be used as a master or as a stamper.

EXAMPLE 12

A thin-film about 70 nm in thickness on a glass support, of Ge-Te-Ti alloy with atomic composition of 45%–53%–2% was prepared and laser-marked as in Example 1.

A solution of 3.0 wt % $Na_2Cr_2O_7$, 3.0 wt % NaOH and 0.025 wt % Fluorad FC-99 surfactant in water was freshly prepared as etchant. The disk was immersed in the etchant for 180 seconds while the disk was spinning. The disk was then rinsed sequentially in a 0.025 wt % Fluorad FC-99 solution and in distilled water. The disk was subsequently dried by spinning at high rate.

The disk was then examined by optical microscopy and SEM. It was found that the laser crystallized spots and tracks were completely etched away and the boundaries were well defined. The amorphous area was only slightly etched. This etched disk was then ready to be used as a master or as a stamper.

We claim:

1. A method for forming a stamper for making replicate optical elements, said method comprising the steps of:
    a) focusing an information modulated energy beam on a phase-change optical recording layer so as to form a pattern of two different phases in said layer corresponding to said information; and
    b) selectively etching away one of said two different phases so as to form a relief pattern corresponding to said information;
    c) conductively coating the master produced in step b) and electroplating said conductive coating with nickel; and
    d) polishing and peeling the nickel layer formed in step c) from the surface of said master.

2. A method for making a replicate optical element comprising the steps of:
    a) focusing an information modulated energy beam on a phase-change optical recording layer so as to form a pattern of two different phases in said layer corresponding to said information; and
    b) selectively etching away one of said two different phases so as to form a relief pattern corresponding to said information;
    c) pressing the master formed in step b) into a polymer layer and photopolymerizing said polymer layer so form a replicate of said relief pattern.

* * * * *